United States Patent
Samadani et al.

(10) Patent No.: US 8,199,165 B2
(45) Date of Patent: Jun. 12, 2012

(54) METHODS AND SYSTEMS FOR OBJECT SEGMENTATION IN DIGITAL IMAGES

(75) Inventors: Ramin Samadani, Palo Alto, CA (US); Thomas G. Malzbender, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 12/579,000

(22) Filed: Oct. 14, 2009

(65) Prior Publication Data

US 2011/0085028 A1    Apr. 14, 2011

(51) Int. Cl.
G09G 5/00    (2006.01)
(52) U.S. Cl. .......................... 345/625; 345/628; 345/643
(58) Field of Classification Search .................. 345/625, 345/628, 643
See application file for complete search history.

(56) References Cited

U.S. PATENT DOCUMENTS

| | | | |
|---|---|---|---|
| 7,639,396 B2* | 12/2009 | Bezryadin | 345/428 |
| 8,116,562 B2* | 2/2012 | Bezryadin | 348/612 |
| 2007/0154083 A1* | 7/2007 | Bezryadin | 382/162 |
| 2009/0102856 A1* | 4/2009 | Bezryadin | 345/591 |
| 2011/0075257 A1* | 3/2011 | Hua et al. | 359/464 |

* cited by examiner

*Primary Examiner* — Phuoc Nguyen

(57) ABSTRACT

Various embodiments of the present invention are directed to object segmentation of digital video streams and digital images. In one aspect, a method for segmenting an object in a digitally-encoded image includes designing a non-linear local function that generates function values associated with identifying the object of interest and a combination function that combines the function values, the object of interest encoded in digital image data. The method includes forming orthogonal projections of the digital image data based on the function values and the combination function. In addition, the orthogonal projections can be used to determining boundaries segmenting the object in the digital image data. The method also includes extracting an image of the object that lies within the boundaries.

20 Claims, 15 Drawing Sheets

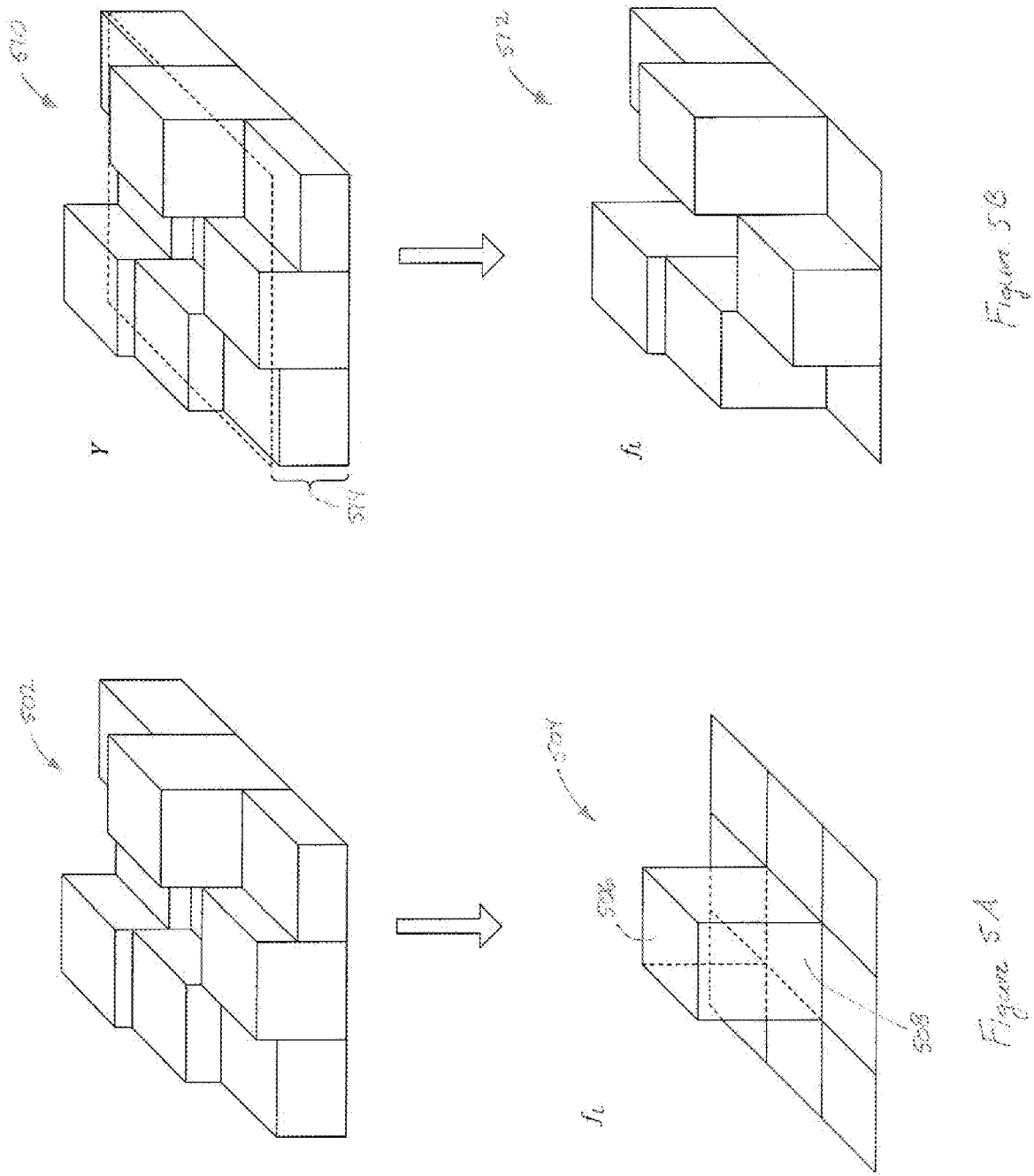

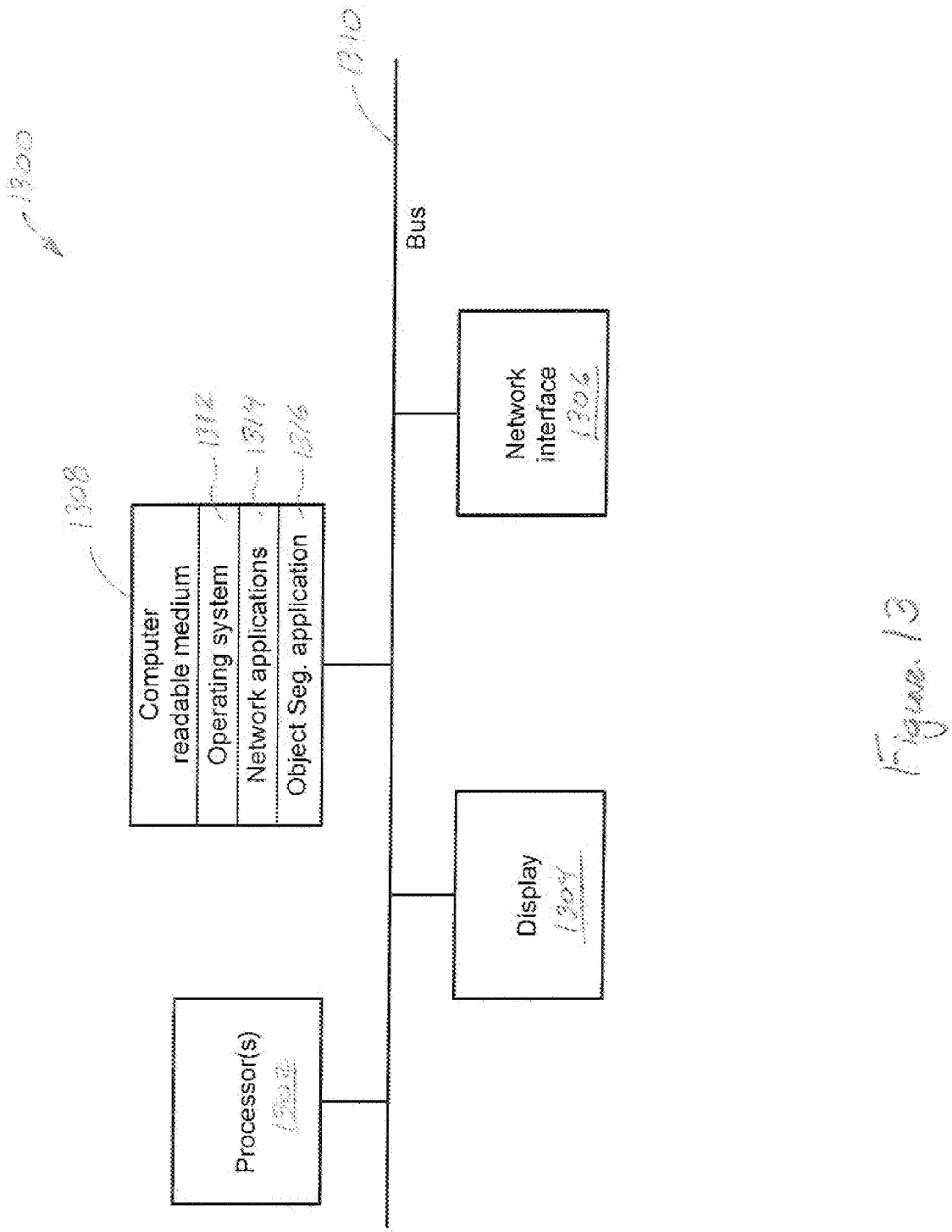

METHODS AND SYSTEMS FOR OBJECT SEGMENTATION IN DIGITAL IMAGES

TECHNICAL FIELD

Embodiments of the present invention relate to video and image processing.

BACKGROUND

Object segmentation enables identification of objects in a digital video stream or image and can be used to simplify and/or change the representation of an image into something that is more meaningful and/or is easier to analyze by computer. For example, object segmentation is key to many robotic vision applications. Most vision-based autonomous vehicles acquire information regarding the location of obstacles in their surroundings by identifying the obstacles in a stream of video. It addition, object segmentation can be used for high-level image understanding and scene interpretation such as spotting and tracking events in surveillance video. In particular, pedestrian and highway traffic can be regularized using density evaluations obtained by segmenting people and vehicles. Using object segmentation, speeding and suspicious moving cars, road obstacles, and other uncommon activities may be detected.

However, typical object segmentation algorithms are configured to perform object segmentation of image data in two or even three dimensions in real-time. Thus, because of the complex nature of most object segmentation algorithms, and because of the large quantities of video information processed in real-time, most object segmentation algorithms are computationally intensive and have to be executed on high-end computational devices.

Designers and users of object segmentation methods and systems continue to seek enhancements of object segmentation in digital images.

BRIEF DESCRIPTION OF THE DRAWINGS

FIGS. 5A-5D show examples of non-linear local functions designed in accordance with embodiments of the present invention.

FIG. 13 shows a schematic representation of a computing device configured in accordance with embodiments of the present invention.

DETAILED DESCRIPTION

Various embodiments of the present invention are directed to object segmentation of digital video streams and digital images. In particular, embodiments of the present invention are directed to performing object segmentation using two or more one-dimensional projections of local function representations of selected pixels values in order to identify particular objects in a digital image or digital video stream. Embodiments of the present invention provide and allow for sophisticated one-dimensional signal processing techniques, such as abrupt change detection, to be applied to each one-dimensional projection.

I. Color Models

Figure 1:
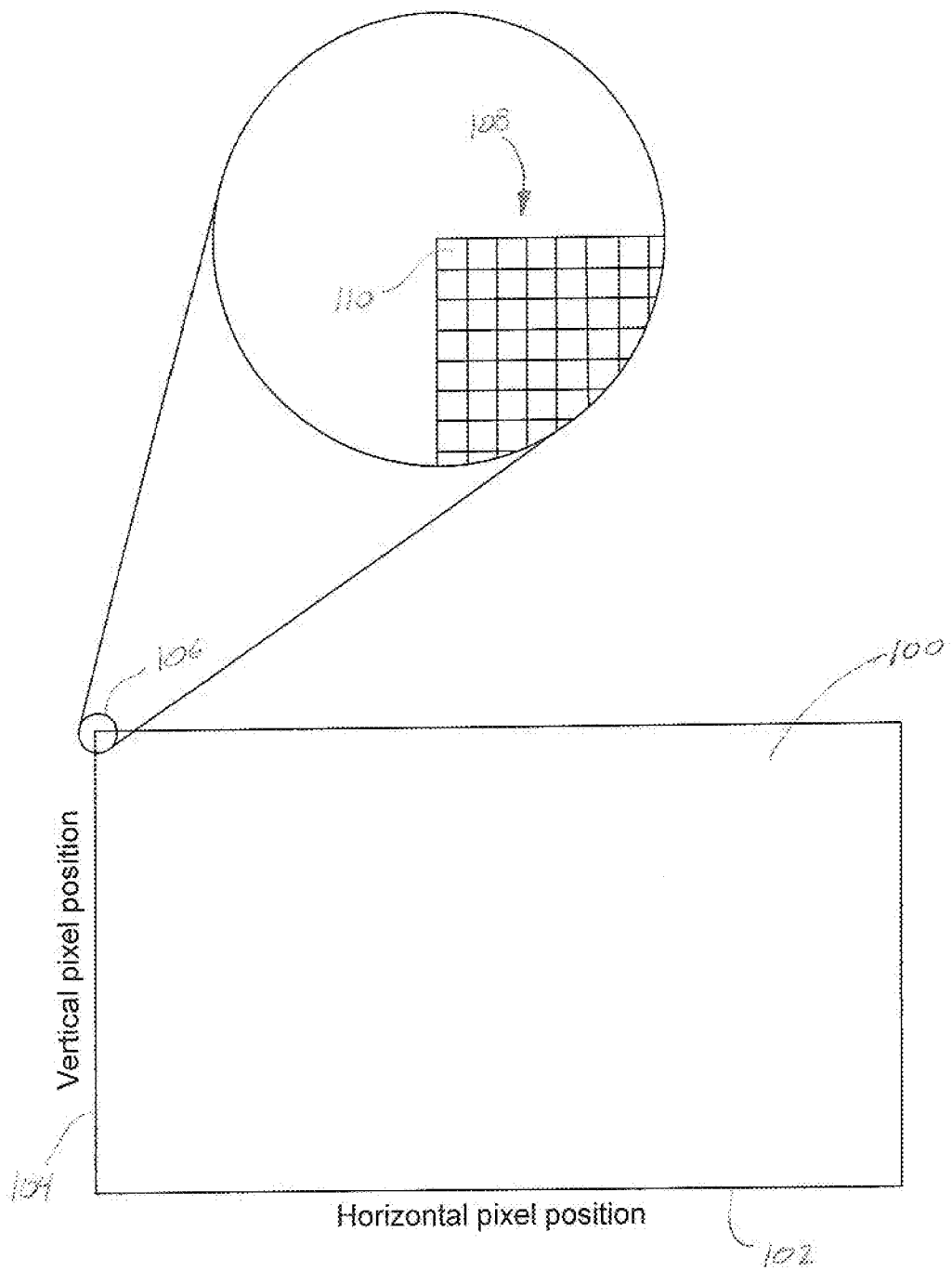
FIG. 1 shows a digitally-encoded image.

FIG. 1 shows a digitally-encoded image 100. A digitally-encoded image can be a still photograph, a video frame, or any of various graphical objects. In general, a digitally-encoded image comprises a sequence of digitally encoded numbers that together describe a rectangular image 100. The rectangular image has a horizontal dimension 102 and a vertical dimension 104, the ratio of which is referred to as the "aspect ratio" of the image.

A "pixel" can be any of the small discrete elements of visual information that together constitute an image or any of the detecting elements of a charge-coupled device used as an optical sensor, such as an optical sensor in a digital camera. For simplicity's sake, in the following discussion, pixels are described with reference to digitally-encoded images, where pixels represent the smallest components of visual information. In FIG. 1, a small portion 106 of image 100 is shown magnified, revealing a tiny portion 108 of a corner of the image 100. Magnification reveals that the displayed image 100 is divided into a grid of small squares, each small square, such as square 110, corresponding to, or representing, a pixel. A video image is digitally encoded as a series of data units, each data unit describing the light characteristics of one pixel within the displayed image 100. The pixels can be thought of as cells within a matrix, with each pixel location described by a horizontal coordinate and a vertical coordinate. The pixels can alternatively be considered to be one long linear sequence of pixels, produced in raster-scan order, or in some other predefined order. In general, a logical pixel in a digitally-encoded image is relatively directly translated into light emission from one or several tiny display elements of a display device. Each pixel is also compose of a number of pixel values, each pixel value corresponding to a particular piece of visual information, such as luminance, primary color brightness, chrominance, or depth. The number that digitally encodes the value of each pixel is translated into one or more electronic voltage signals to control the display unit to emit light of a proper hue and intensity so that, when all of the display units are controlled according to the pixel values encoded in a digitally-encoded image, the display device faithfully reproduces the encoded image for viewing by a human viewer. Digitally-encoded images may be displayed on a cathode-ray-tube, an LCD, or a plasma display devices incorporated within televisions, computer display monitors, and other light-emitting display devices, may be printed onto paper or synthetic films by computer printers, may be transmitted through digital communications media to remote devices, may be stored on mass-storage devices and in computer memories, and may be processed by various image-processing application programs.

Figure 2:
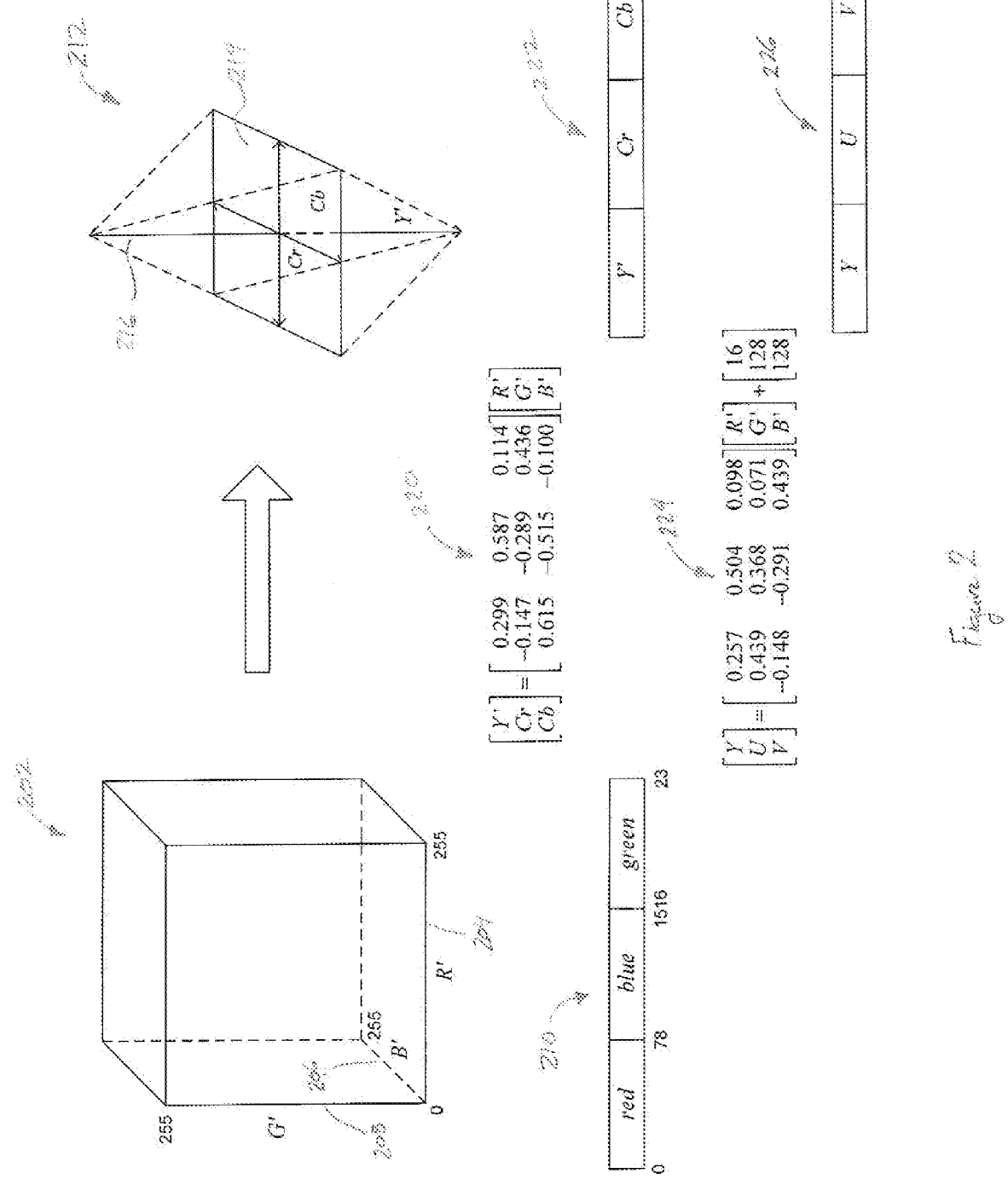
FIG. 2 shows two different pixel-value encoding methods according to two different color-and-brightness models.

There are various different methods and standards for encoding color and emission-intensity information into a data unit. FIG. 2 shows two different pixel-value encoding methods according to two different color-and-brightness models. A first color model 202 is represented by a cube. The volume within the cube is indexed by three orthogonal axes, the R' axis 204, the B' axis 206, and the G' axis 208. In this example, each axis is incremented in 256 increments, corresponding to all possible numerical values of an eight-bit byte, with alternative R'G'B' models using a fewer or greater number of increments. The volume of the cube represents all possible color-and-brightness combinations that can be displayed by a pixel of a display device. The R', B', and G' axes correspond to red, blue, and green components of the colored light emitted by a pixel. The intensity of light emission by a display unit is generally a non-linear function of the voltage supplied to the data unit. In the RGB color model, a G-component value of 127 in a byte-encoded G component would direct one-half of the maximum voltage that can be applied to a display unit to be applied to a particular display unit. However, when one-half of the maximum voltage is applied to a display unit, the brightness of emission may significantly exceed one-half of the maximum brightness emitted at full voltage. For this reason, a non-linear transformation can be applied to the increments of the RGB color model to produce increments of the R'G'B' color model, so that the scaling is linear with respect to perceived brightness. The encoding for a particular pixel 210 may include three eight-bit bytes, for a total of 24 bits, when up to 256 brightness levels can be specified for each of the red, blue, and green components of the light emitted by a pixel. When a larger number of brightness levels can be specified, a larger number of bits may be used to represent each pixel, and when a lower number of brightness levels are specified, a smaller number of bits may be used to encode each pixel.

Although the R'G'B' color model is relatively easy to understand, particularly in view of the red-emitting-phosphor, green-emitting-phosphor, and blue-emitting-phosphor construction of typical display units in CRT screens, a variety of related, but different, color models are more useful for video-signal compression, decompression, and other video processing methods. One such alternative color model is the YCrCb color model. The YCbCr color model can be abstractly represented as a bi-pyramidal volume 212 with a central, horizontal plane 214 containing orthogonal Cb and Cr axes, with the long, vertical axis 216 of the bi-pyramid corresponding to the Y axis. In this color model, the Cr and Cb axes are color-specifying axes, with the horizontal mid-plane 214 representing all possible hues that can be displayed, and the Y axis represents the brightness or intensity at which the hues are displayed. The numerical pixel values that specify the red, blue, and green components in the R'G'B' color model can be directly transformed to equivalent YCbCr pixel values by a simple matrix transformation, such as matrix transformation 220. Thus, when eight-bit quantities are used to encode the Y, Cr, and Cb components of display-unit emission according to the YCbCr color model, a 24-bit data unit 222 can be used to encode the value for a single pixel. A second color model is the YUV color model. The YUV color model can also be abstractly represented by the same bi-pyramidal volume 212 with the central, horizontal plane 214 containing orthogonal U and V axes, with the long, vertical axis of the bi-pyramid 216 corresponding to the Y axis. The numerical pixel values that specify the red, blue, and green components in the R'G'B' color model can be directly transformed to equivalent YUV pixel values by a second matrix transformation, such as the matrix transformation 224. When eight-bit quantities are used to encode the Y, U, and V components of display-unit emission according to the YUV color model, a 24-bit data unit 226 can also be used to encode the value for a single pixel.

Figure 3:
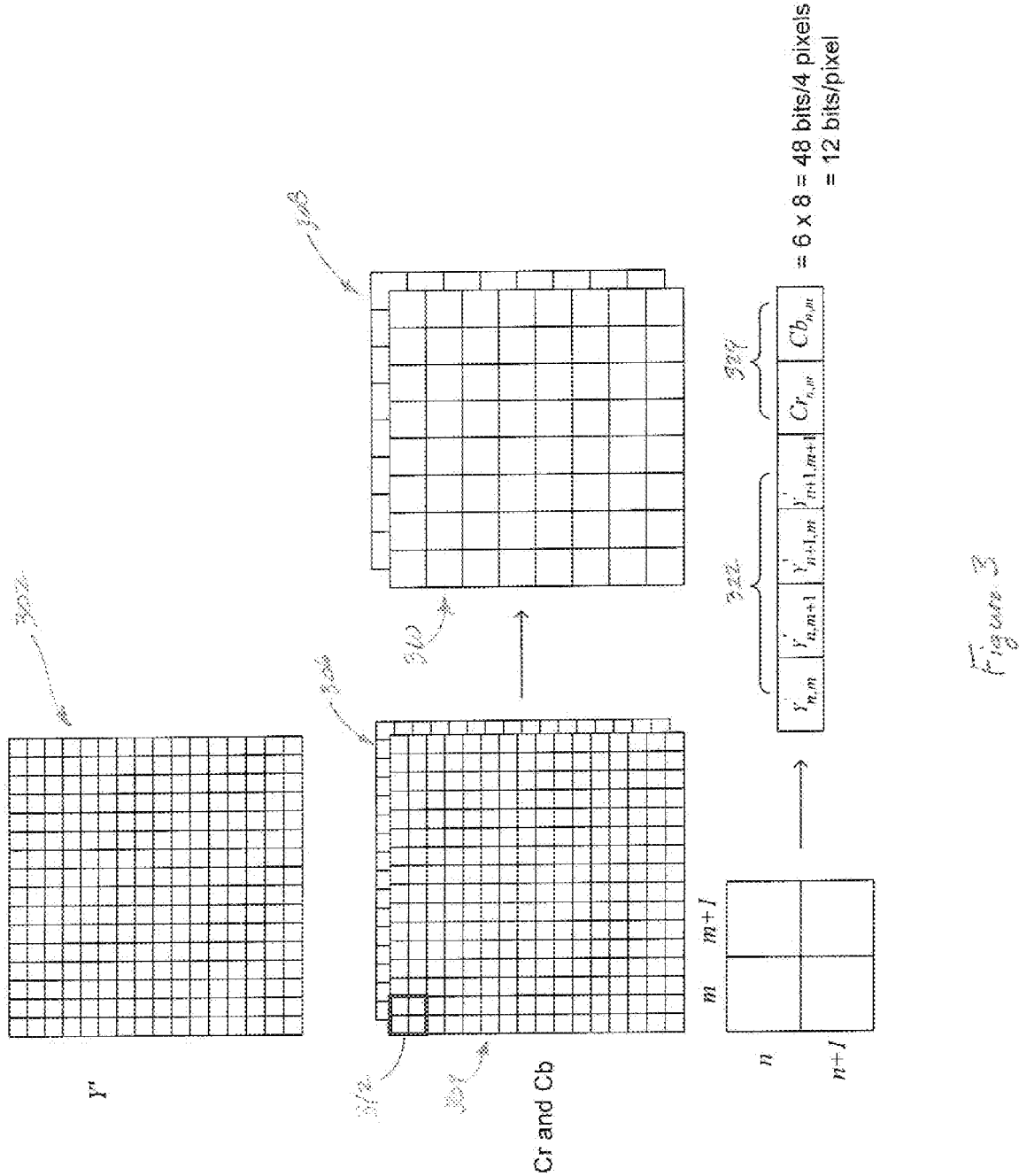
FIG. 3 shows digital encoding using a color model.

For image processing, when the YCbCr color model is employed, a digitally-encoded image can be thought of as three separate pixilated planes, superimposed one over the other. FIG. 3 shows digital encoding using the YCbCr color model. A digitally-encoded image, as shown in FIG. 3, can be considered to be a Y image 302 and two chroma images 304 and 306. The Y plane 302 essentially encodes the brightness values at each pixel of the image, and is equivalent to a monochrome representation of the digitally-encoded image. The two chroma planes 304 and 306 together represent the hue, or color, at each pixel in the digitally-encoded image. In other words, each pixel is stored as a single Y value, a single Cr value, and a single Cb value. This type of image encoding is referred to as YCbCr (4:4:4). For many video-processing and video-image-storage purposes, it is convenient to decimate the Cr and Cb planes to produce Cr and Cb planes 308 and 310 with one-half resolution. In other words, rather than storing an intensity and two chroma values for each pixel, an intensity value is stored for each pixel, but a pair chroma values is stored for each 2×2 square containing four pixels. This type of image encoding is referred to as YCbCr (4:2:2). For example, all four pixels in the left upper corner of the image 312 are encoded to have the same Cr value and Cb value. For each 2×2 region of the image 320, the region can be digitally encoded by four intensity values 322 and two chroma values 324, 48 bits in total, or, in other words, by using 12 bits per pixel. Using one quarter as many chroma values as luma values is referred to as YCbCr (4:2:0).

II. Object Segmentation Methods

Method embodiments of the present invention use non-linear projections based on non-linear local functions applied to local neighborhoods of pixels in order to segment objects in images. A neighborhood of pixels is a collection of pixels surrounding a pixel, denoted by $N_{(x,y)}$, where x and y are the horizontal and vertical coordinates, respectively, of the pixel surrounded by the collection of pixels. A neighborhood can be a simple neighborhood composed of a single pixel, or a neighborhood can be composed of any number of pixels with any suitable arrangement or pattern of pixels surrounding a pixel.

Figure 4A:
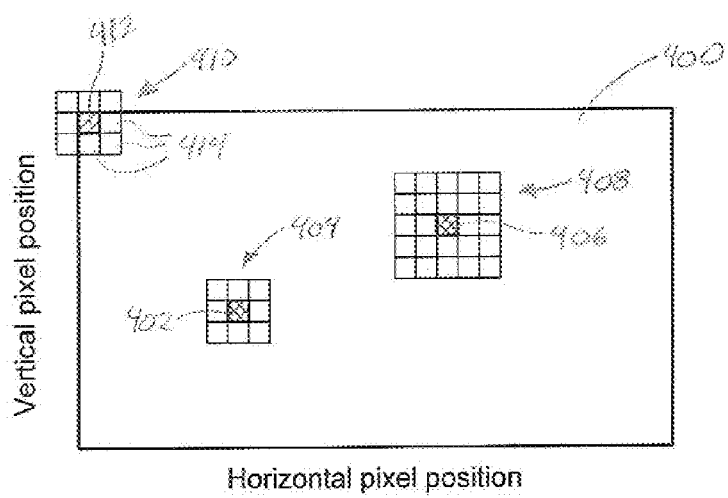
FIGS. 4A-4C show examples of different types of neighborhoods of pixels configured in accordance with embodiments of the present invention.
Figure 4B:
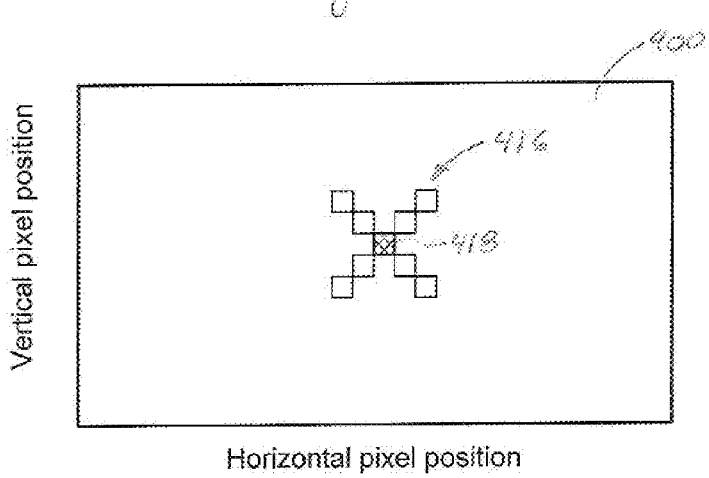
Figure 4C:
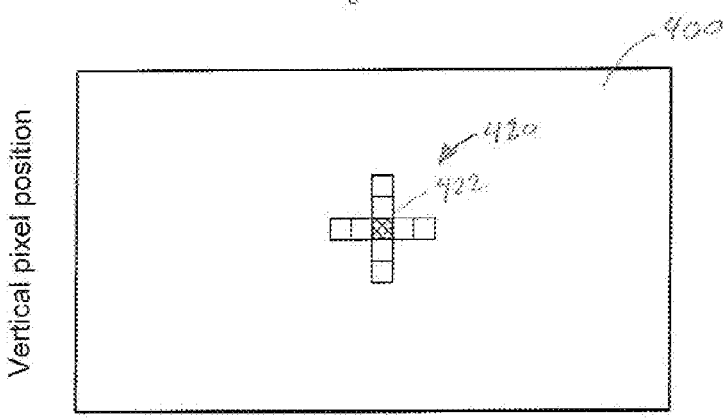

FIGS. 4A-4C show examples of several different types of neighborhoods of pixels configured in accordance with embodiments of the present invention. FIG. 4A shows examples of square-shaped neighborhoods of pixels. For example, a pixel 402 is the central pixel of a square 3×3 neighborhood 404 of the closest pixels surrounding the pixel 402. FIG. 4A also shows a pixel 406 located at the center of a larger square 5×5 neighborhood 408 of the closest pixels surrounding the pixel 406. For a pixel located along the edge or at the corner of a digital image, the neighborhood of pixels can be centered on the pixel, but the neighborhood of pixels includes only those pixels that fall within the image. For example, a 3×3 neighborhood 410 of pixels centered on a corner pixel 412 is actually composed of the three pixels 414 located adjunct to the pixel 412.

Neighborhoods of pixels $N_{(x,y)}$ are not limited to square-shaped patterns, as described above. In other embodiments, a neighborhood can be composed of any suitable pattern of pixels. Neighborhood patterns can include, but are not limited to, rectangular, circular, elliptical, or other suitable geometric or irregular shapes. FIG. 4B shows an example of a neighborhood of pixels 416 centered on a pixel 418, where the neighborhood of pixels 416 is patterned to include pixels located diagonal to the pixel 418. FIG. 4C shows another example of a neighborhood of pixels 420 centered on a pixel 422, where the neighborhood of pixels 420 is patterned to include pixels extending parallel to the horizontal and vertical edges of the image 400.

Embodiments of the present invention use non-linear functions that operate locally on the intensity, color, luminance, and/or even depth information associated with the pixels comprising each neighborhood of pixels. The non-linear operations performed by a local function operating on a neighborhood of pixels is denoted by $f_L(N_{(x,y)}(M))$, where M represents the visual information operated on by the local function. For example, image data can be processed in the YCbCr color model described above, where for each pixel, M can represent the luminance Y, the chroma values Cr and/or Cb, or the depth information associated with each pixel (x, y), or M can represent any suitable combination of Y, Cr, Cb, and depth information. In other words, the local function $f_L$ can be configured to operate on one or more pieces of visual information associated with a pixel.

FIGS. 5A-5D show examples of non-linear local functions that are each designed to operate on different visual pixel information in accordance with embodiments of the present invention. In the examples of FIGS. 5A-5D, three-dimensional isometric plots of a 3×3 arrangement of nine pixels are used to represent the relative numerical values associated with the luminance, chrominance, or depth at each of the nine pixels and local function values associated with the pixels.

FIG. 5A represents operations performed by local functions that map pixel values of a neighborhood composed of a plurality of pixels to a value for a single pixel. In other words, FIG. 5A represents operations performed by local functions that are many pixel values to a single pixel value mapping. As shown in the example of FIG. 5A, in a first isometric plot 502, the height of each box can represent a pixel value, such as red, green or blue intensity; luminance Y; chrominance (Cr or Cb); or depth associated each pixel of a 3×3 neighborhood of pixels. A second isometric plot 504 shown in FIG. 5A represents the output of a local function $f_L$ that produces a single value 506 associated with a central pixel 508 of the 3×3 neighborhood based on the nine values associated with the pixels represented in plot 502. In certain embodiments, the local function $f_L$ can be a maximum operator that searches the pixel values of the pixels in the 3×3 neighborhood and outputs the largest pixel value 506 for the pixel 508. In other embodiments, the local function $f_L$ can be a minimum operator that searches the pixel values of the pixels in the 3×3 neighborhood and outputs the smallest pixel value 506 for the pixel 508. In other embodiments, the local function $f_L$ can compute the average of the pixel values of the pixels in the 3×3 neighborhood and output the average pixel value 506 for the pixel 508. In other embodiments, the local function $f_L$ can perform a weighted average of the pixel values of the pixels located in the neighborhood of pixels, based on the proximity of the pixels in the neighborhood of pixel 508, and output a weighted average pixel value 506 for the pixel 508. Embodiments of the present invention are not limited to local functions that operate on 3×3 neighborhoods of pixels. In other embodiments, the local functions can operate any type of neighborhood of pixels with any number of pixels, such as the neighborhoods described above with reference to FIG. 4.

Figure 5C:
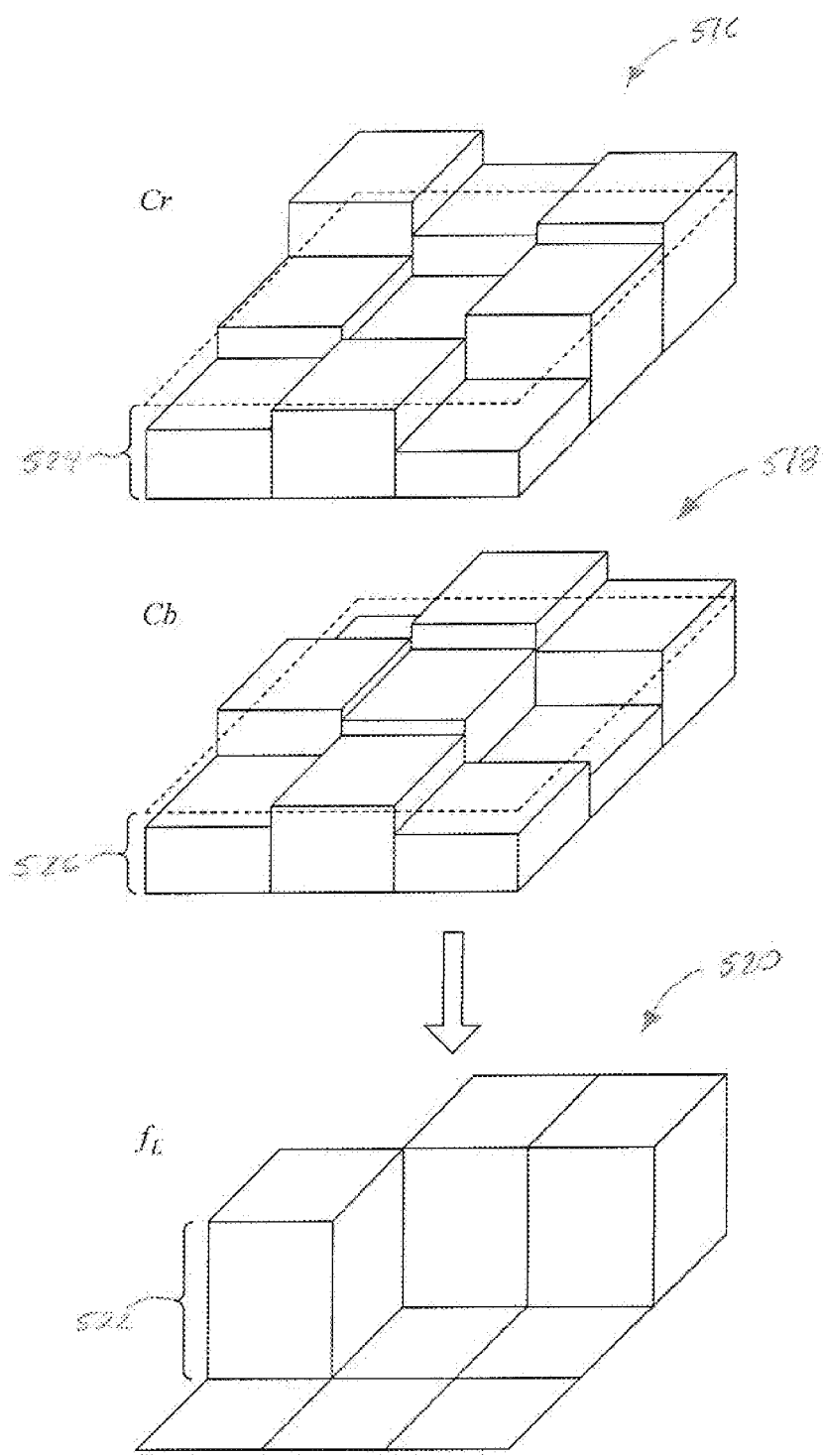
Figure 5D:
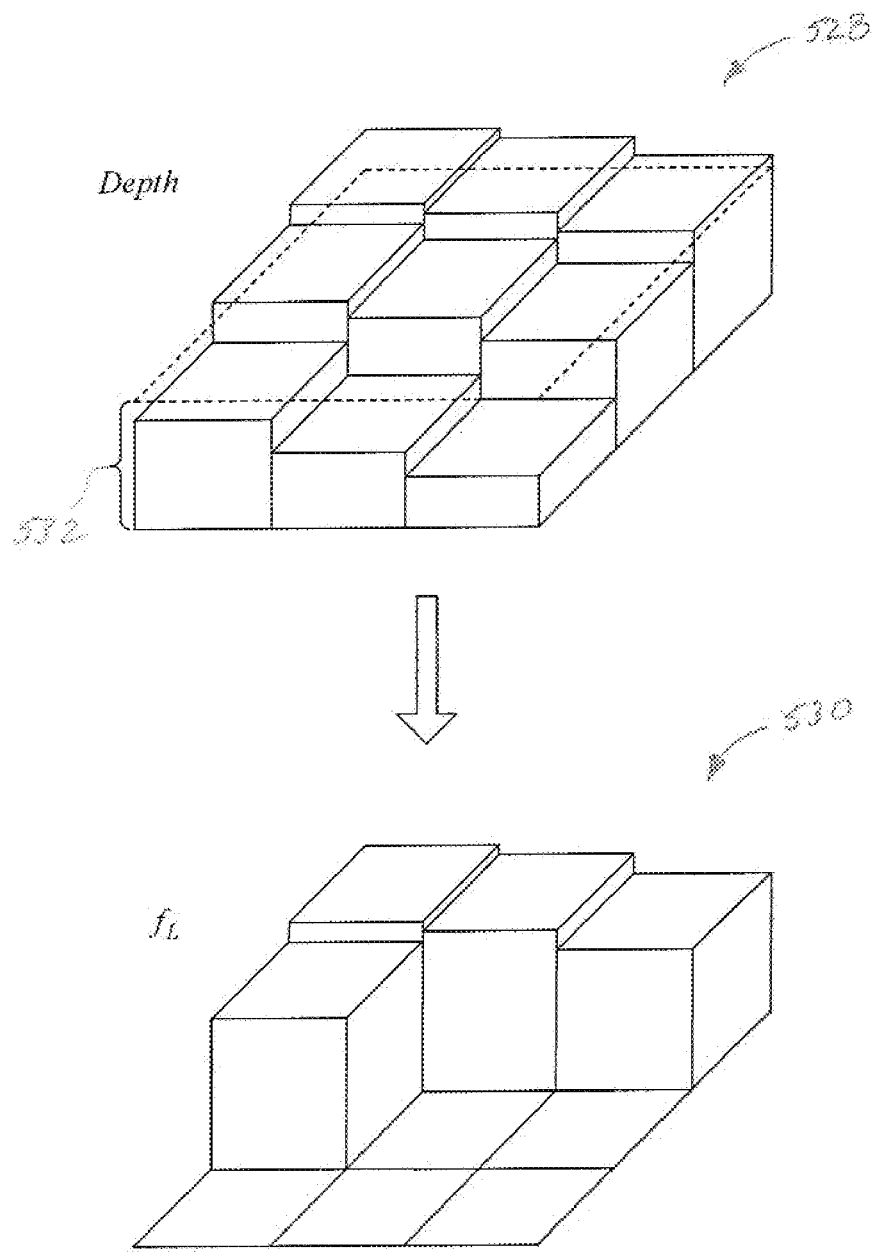

In other embodiments, a non-linear local function can be designed to operate as filter on particular pixel values associated with each pixel. FIGS. 5B-5D represent examples of non-linear local filter functions that can be used to separate pixel values based on a threshold value or a range of values. In the example shown in FIG. 5B, a first isometric plot 510 represents the luminance values associated with a 3×3 arrangement of nine pixels. A second isometric plot 512 represents values of a local function $f_L$ that assigns a "0" luminance value to pixels with luminance values that are smaller than a threshold value 514, shown in FIG. 5A, otherwise the local function $f_L$ does not change the pixel value. In other embodiments, a local function $f_L$ can be configured to assign "0" luminance value to pixels with luminance values that are larger than a threshold value, or assign "0" luminance value to pixels with luminance values that fall outside a particular range of luminance values.

In other embodiments, a local function $f_L$ can be configured to separate various objects in an image based on object color. In the example shown in FIG. 5C, a first isometric plot 516 represents the chroma Cr values associated with a 3×3 arrangement of nine pixels, and a second isometric plot 518 represents the chroma Cb values associated with the same set of nine pixels. A third isometric plot 520 represents values of a local function $f_L$ that assigns a particular pixel function value 522 to pixels with chroma Cr values that are larger than a threshold value 524 and with chroma Cb values that are larger than a threshold 526 and assigns a "0" function value to pixels chroma values that are smaller than these thresholds. In other embodiments, a local function $f_L$ can be configured to assign a particular function value to pixels with associated chroma Cr values that fall within a first range and chroma Cb values that fall within a second range and assign a "0" function value to pixels with chroma values that fall outside of the these ranges.

In other embodiments, a local function $f_L$ can be constructed to separate various objects based on depth information provided by a depth camera. Each pixel of a digital image produced by a depth camera includes depth information that can be used to separate objects based on the object's distance from the camera. In the example shown in FIG. 5D, a first isometric plot 528 represents depth pixel values associated with a 3×3 arrangement of nine pixels. A second isometric plot 530 represents the output of a local function $f_L$ that assigns a "0" function value to pixels with depth values that are larger than a threshold value 532. This kind of threshold can be used to identify objects that fall within a distance associated with the threshold value. In other embodiments, a local function $f_L$ can be constructed to assign "0" function values to pixels with depth values that are smaller than a threshold value, thereby enabling objects that are farther from the distance associated with the threshold value to be identified. In still other embodiments, a local function $f_L$ can be constructed to assign "0" function values to pixels outside of a range of threshold values in order to identify objects that lie with a particular distance range.

Next, the local, non-linear function values associated with each pixel are projected in a first direction and projected in a second direction in order to obtain two separate projections of the local function values. In one embodiment, the first and second projections can be horizontal and vertical projections represented by:

$$p_H(x) = f_C(f_L(N_{(x,y)}(M))) \text{ for } y=0, 1, \ldots, N_y-1$$

$$p_V(y) = f_C(f_L(N_{(x,y)}(M))) \text{ for } x=0, 1, \ldots, N_x-1$$

where $f_C$ is a potentially nonlinear combination function that combines the output of the local function $f_L$, $N_y$ equals the number of pixels in the vertical direction of the image, and $N_x$ equals the number of pixels in the horizontal direction of the image.

The first and second directions can be orthogonal. The two projections can be used to segment objects shown in the image, as described below.

Figure 6:
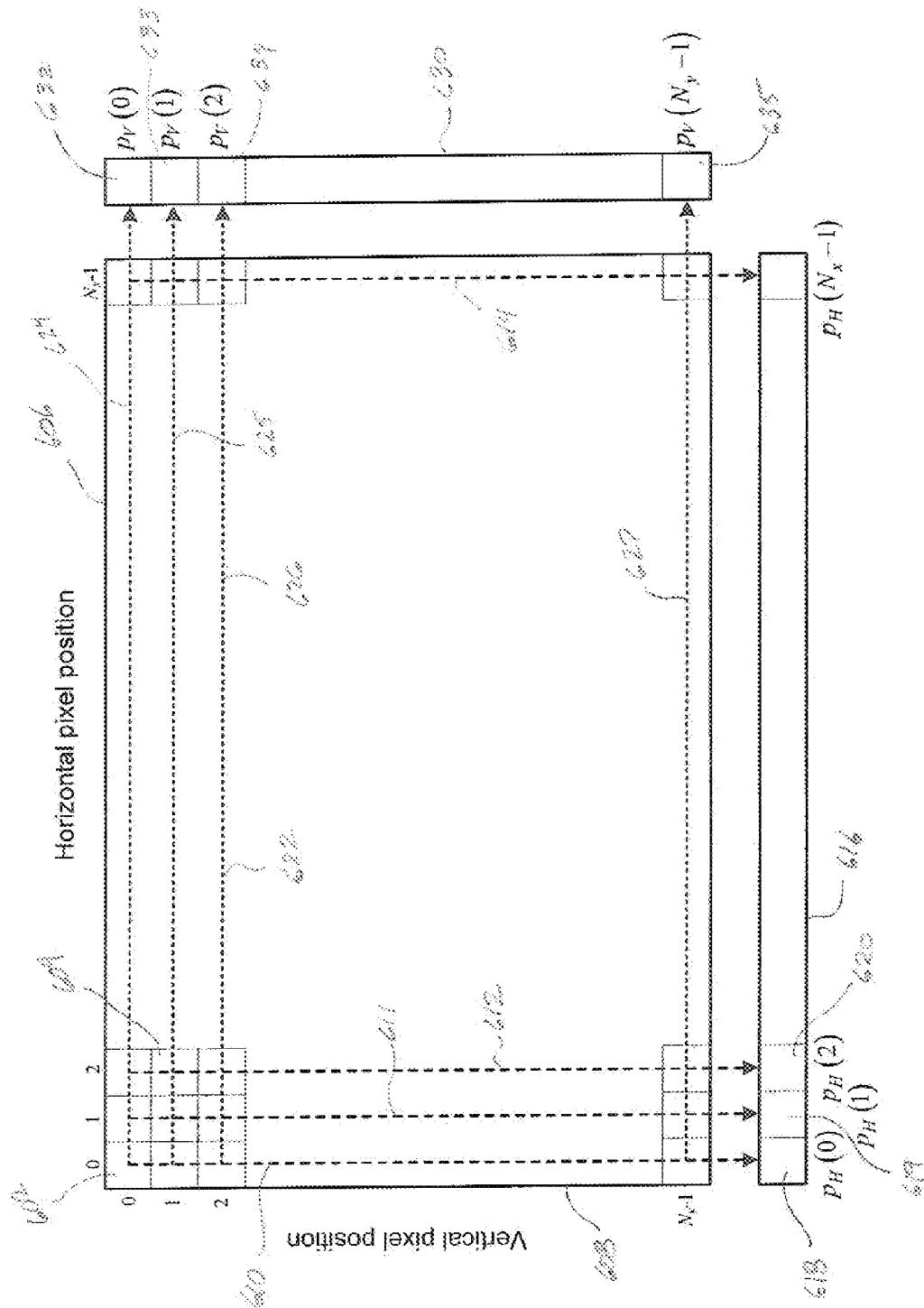
FIG. 6 shows combining local function values in accordance with embodiments of the present invention.

FIG. 6 shows projecting local function values obtained from an image in accordance with embodiments of the present invention. In the example of FIG. 6, each square 602 represents a local function value of a pixel of a digitally-encoded image. Each local function value can be obtained by applying a non-linear local function $f_L$ to each pixel of the digitally-encoded image as described above with reference to FIGS. 5A-5D. Four of $N_x$ horizontal pixel positions are labeled $0, 1, 2, \ldots, N_x-1$ along edge 606, and four of $N_y$ vertical pixel positions are labeled $0, 1, 2, \ldots, N_y-1$ along edge 608. Each function value also has an associated horizontal and vertical pixel coordinate. For example, function value 604 has a pixel coordinate (2,1). The projection $p_H(x)$ at a horizontal pixel position x is obtained by combining the local function values $f_L$ for each y from 0 to $N_y-1$ in accordance with the combination function $f_C$. For example, as shown in FIG. 6, dashed-line directional arrow 610 represents combining the local function values $f_L$ at the horizontal pixel position x equal to "0" for each y from 0 to $N_y-1$ in accordance with the combination function $f_C$ in order to obtain the projection $p_H(0)$. Projections $p_H(1)$ through $p_H(N_x-1)$ can be obtained in a similar manner, as represented by directional arrows 611-614. The projections $p_H(0)$ through $p_H(N_x-1)$ form a horizontal projection that can be stored in an array data structure 616. For example, projections $p_H(0), p_H(1), p_H(1)$, and $p_H(N_x-1)$ are stored in elements 618-620 of the array 616. On the other hand, the projection $p_V(y)$ at a vertical pixel position y is obtained by combining the local function values $f_L$ for each x from 0 to $N_x-1$ in accordance with the combination function $f_C$. For example, as shown in FIG. 6, dotted-line directional arrow 622 represents combining the local function values $f_L$ at the vertical pixel position y equal to "2" for each x from 0 to $N_x-1$ in accordance with the combination function $f_C$ to obtain the projection $p_V(2)$. Projections $p_V(0)$, $p_V(1)$ and $p_V(N_y-1)$ can be obtained in a similar manner, as represented by directional arrows 625-627. The projections $p_V(0)$ through $p_V(N_y-1)$ form a vertical projection that can also be stored in elements of an array data structure 630. For example, projections $p_V(0), p_V(1), p_V(2)$, and $p_V(N_y-1)$ are stored in elements 632-635 of the array 630.

A simple example of a combination function is a summation operator of the local function values represented by:

$$p_H(x) = \sum_{y=0}^{N_y-1} f_L(N_{(x,y)}(M)) \text{ and}$$

$$p_H(y) = \sum_{x=0}^{N_x-1} f_L(N_{(x,y)}(M))$$

The function $f_C$ is in general required to be computed locally or through a recursive formulation that only requires access to local outputs of $f_L$. Other examples of combination functions include, but are not limited to the following. The maximum operator can be used for $f_C$ since it can be computed in a recursive fashion with little storage. Maximum run lengths are also possible to compute with little storage and they can be used to investigate thresholded textures. It is important to note that even when $f_C$ represents a sum, the projection is non-linear because of the non-linearity in $f_L$.

Figure 7:
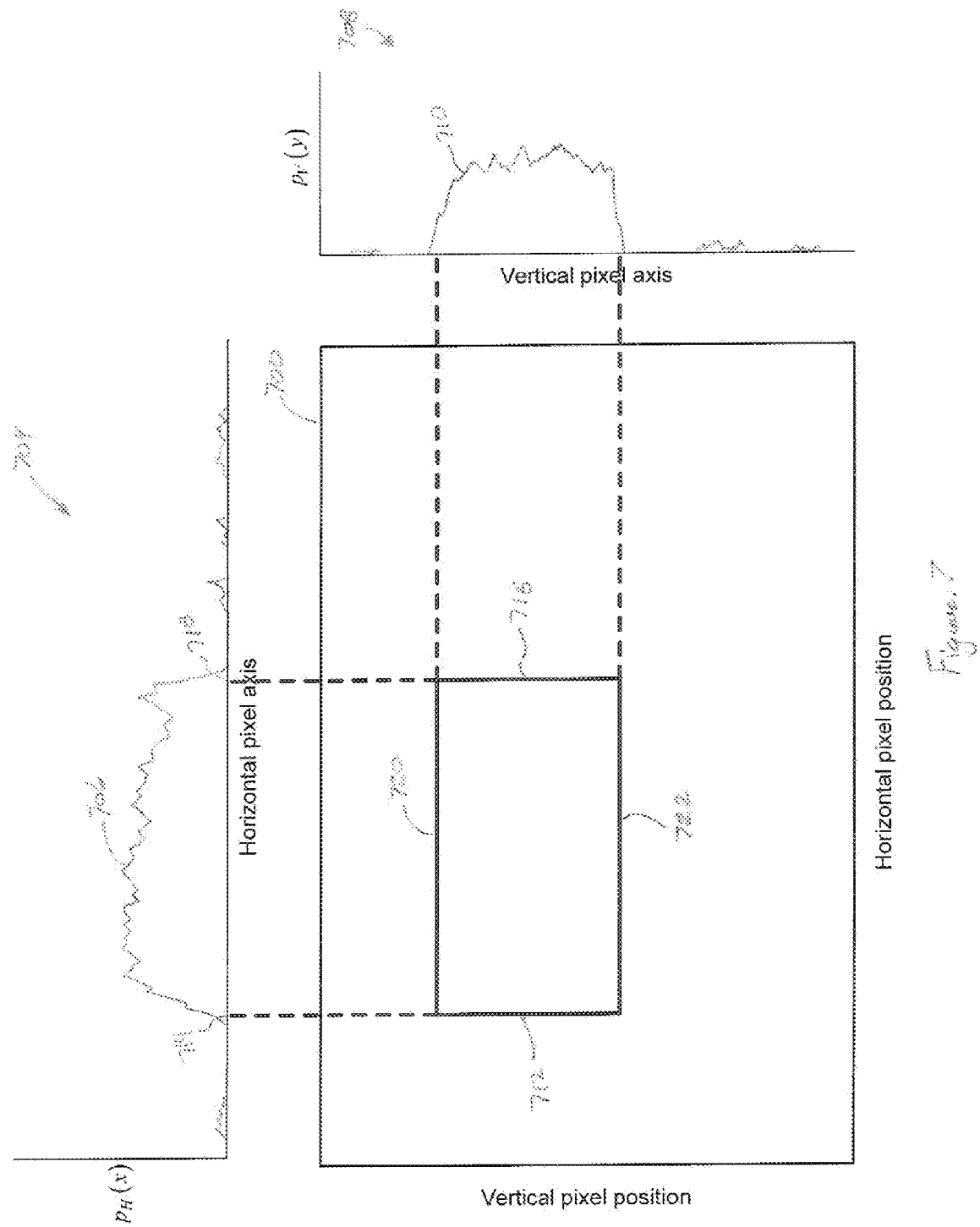
FIG. 7 shows an example of a digitally-encode image and associated plots of projections in accordance with embodiments of the present invention.

The neighborhood $N_{(x,y)}$, local function $f_L$, and combination function $f_C$ are selected to construct horizontal and vertical projections, $p_H(x)$ and $p_V(y)$, which can be used to segment and extract particular objects in an image according to the objects' luminance, color, or depth or various combinations of luminance, color, and depth. FIG. 7 shows an example of a digitally-encoded image 700 and plots of associated hypothetical horizontal and vertical projections in accordance with embodiments of the present invention. A first plot 704 of a curve 706 represents the horizontal projection $p_H(x)$ as a function of the horizontal pixel position of the image 700, and a second plot 708 of a curve 710 represents the vertical projection $p_V(y)$ as a function of the vertical pixel position of the image 700. Curves 706 and 710 can represent a particular luminance value, a primary color value, or a depth value of an object displayed in the image 700. Points along the pixels where the curves 706 and 710 have a selected percentage of their area can be used to identify the boundaries of objects displayed in the image 700. For example, suppose the boundaries are determined using 80% of the area between the curves 706 and 710 and the respective horizontal and vertical pixel axes. Cumulative integration of the curve 706 can be used to determine the total area between the curve 706 and the horizontal pixel axis and the area between curve 706 and the horizontal pixel axis at various points along the horizontal pixel axis. A first boundary 712 can be determined by locating a point 714 along the horizontal pixel axis where 10% of the area between the curve 706 and the horizontal pixel axis is located to the left of the point 714 and 90% of the area between the curve 706 and the horizontal pixel axis is located to the right of the point 714. A second boundary 716 can be determined by locating a point 718 along the horizontal pixel axis where 10% of the area between curve 706 and the horizontal pixel axis is located to the right of the point 718 and 90% of the area between the curve 706 and the horizontal pixel axis is located to the left of the point 718. Boundaries 720 and 722 can be determined in a similar manner using curve 710. An object with pixel values characterized by the curves 706 and 710 lies within the boundaries 712, 716, 720, and 722, which can be used to form a rectangle surrounding the object. The rectangle can in turn be used to extract the object by cropping the portion of the image 700 that falls within the rectangle.

Embodiments of the present invention are not limited to performing a single projection in each direction. In other embodiments more than one projection can be performed in each direction. For example, if one is extracting unknown objects that may be of different colors or of different properties, one can run independent projections for each candidate object. Then the projection that has the most energy can be used to decide which one of the unknown objects it is. The steps would be: 1) run one projection for each candidate object; 2) Process the projections to select the one with most energy; 3) The projection with maximum energy identifies the type of object.

Figure 8:
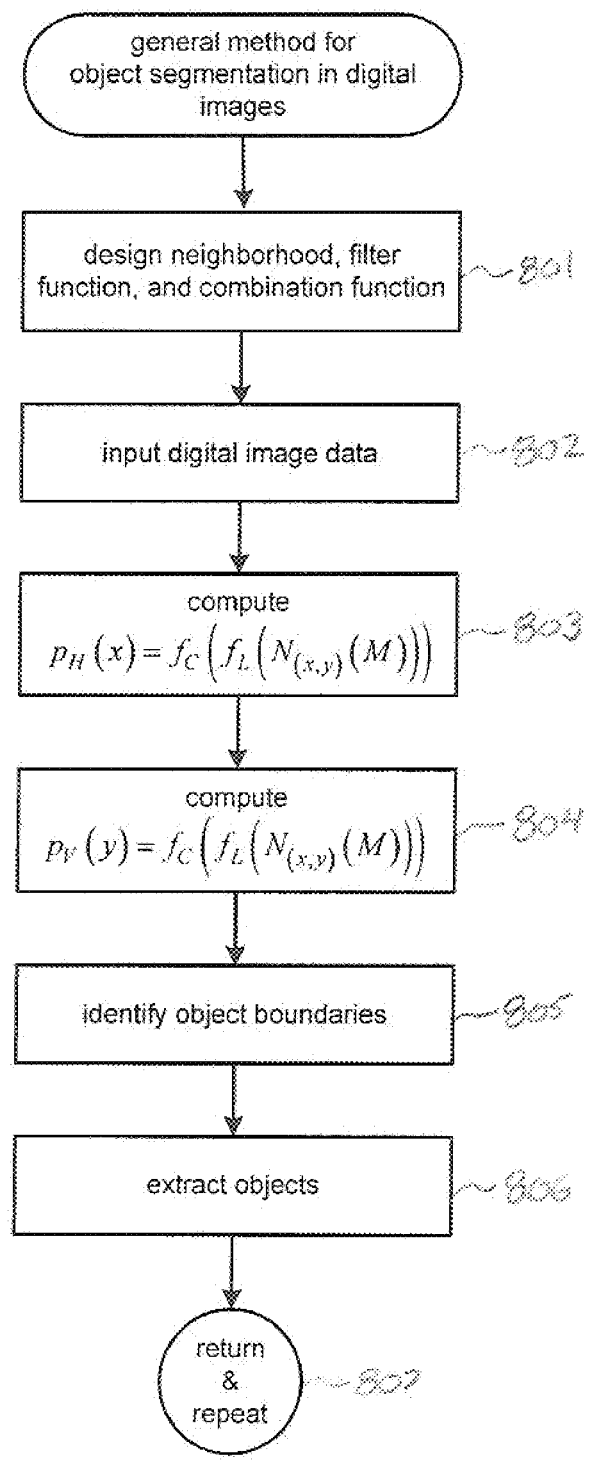
FIG. 8 shows a control-flow diagram that represents a general method for segmenting and extracting an object in a digital image in accordance with embodiments of the present invention.

FIG. 8 shows a control-flow diagram that represents a general method for segmenting an object in a digital image. In step 801, a neighborhood, a filter function, and a combination function are designed to identify pixels having particular pixel values within a digital image, as described above with reference to FIG. 1-6. In step 802, digital image data corresponding to a single video frame of a continuous video stream output from a video camera or a single image obtained from a digital camera is input. In steps 803 and 804, the projections $p_H(x)$ and $p_V(y)$ are computed as described above with reference to FIG. 7. In step 805, based on the projections $p_H(x)$ and $p_V(y)$ obtained in steps 803 and 804, object boundaries are identified and can be used to form a rectangle or other suitable shape that contains the pixels associated with the object. In step 806, the boundaries can be used to crop the portion of the image containing the object pixel data from the image data. In step 807, the steps 801-806 can be repeated for the next video frame or image produced by a digital camera.

III. An Example

Figure 9:
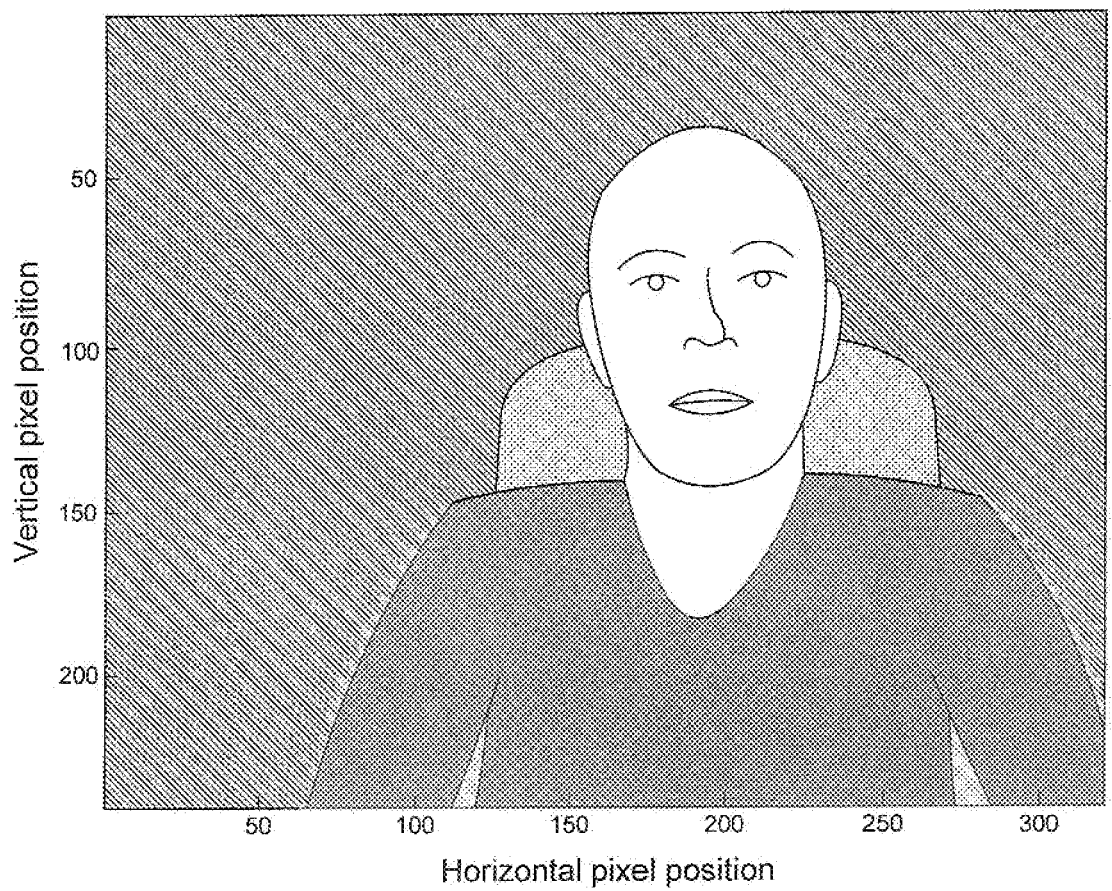
FIG. 9 shows a video frame of a person engaged in a video conference in accordance with embodiments of the present invention.

Methods of the present invention can be used to detect and segment faces of people or other objects in real-time video conferencing. FIG. 9 shows a video frame of a person engaged in a video conference in accordance with embodiments of the present invention. In order to detect and segment the person's face from other background distractions that may be present in the image, the YCbCr color model can be used and a local function $f_L$ can be constructed to separate the chroma values Cr and Cb associated with flesh tones or flesh colors from other colors. An example of a local function that can be used to detect flesh tones is represented by:

$$f_t(N_{(x,y)}(Cr, Cb)) = \begin{cases} 1 & \text{for } 77 \leq Cb \leq 127 \text{ and } 133 \leq Cr \leq 173 \\ 0 & \text{otherwise} \end{cases}$$

(See e.g., "Skin segmentation using color pixel classification: analysis and comparison," Phung, Bouzerdoum, and Chai, *IEEE Trans. on Pattern Analysis and Machine Intelligence*, vol. 27, no. 1, January 2005)
In addition, the combination function can be a summation function given by:

$$p_H(x) = \sum_{y=0}^{N_y-1} f_L(N_{(x,y)}(Cr, Cb)) \text{ and}$$

$$p_H(y) = \sum_{x=0}^{N_x-1} f_L(N_{(x,y)}(Cr, Cb))$$

Figure 10A:
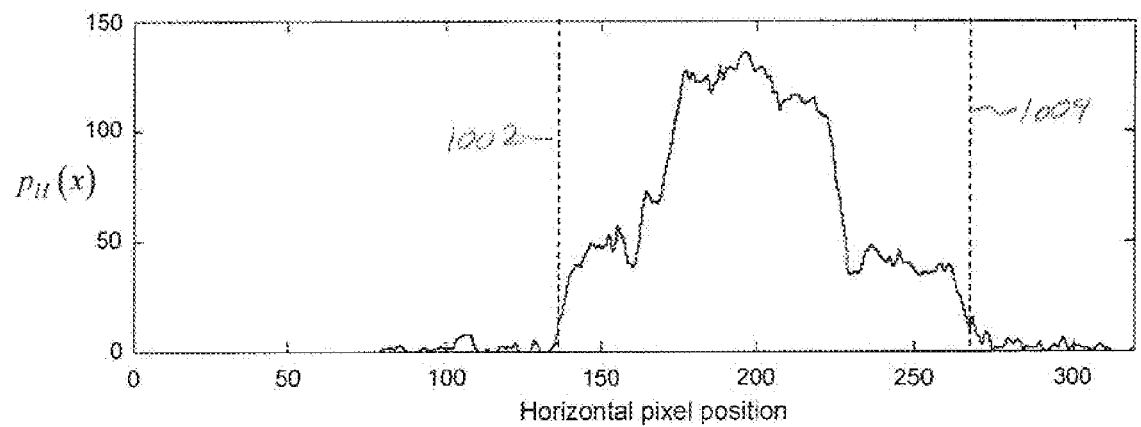
FIGS. 10A-10B show plots of projections obtained in accordance with embodiments of the present invention.
Figure 10B:
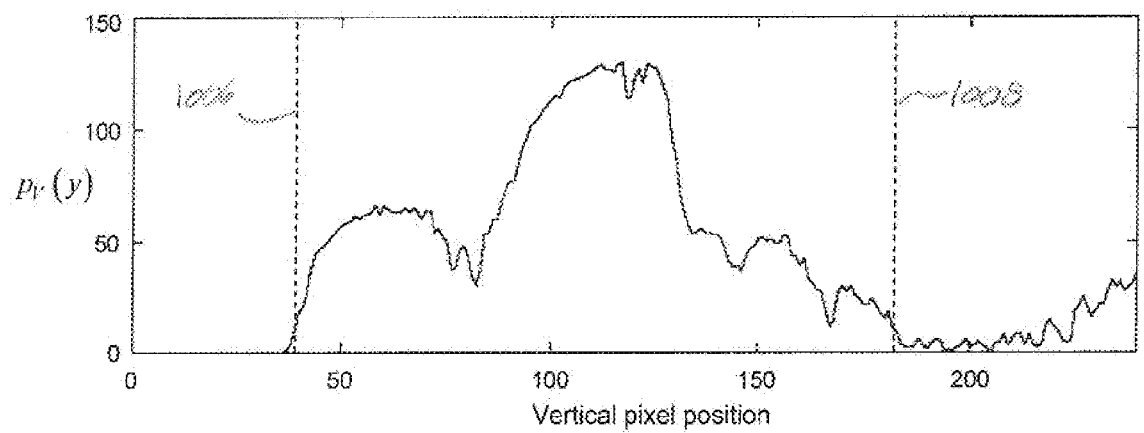
Figure 11:
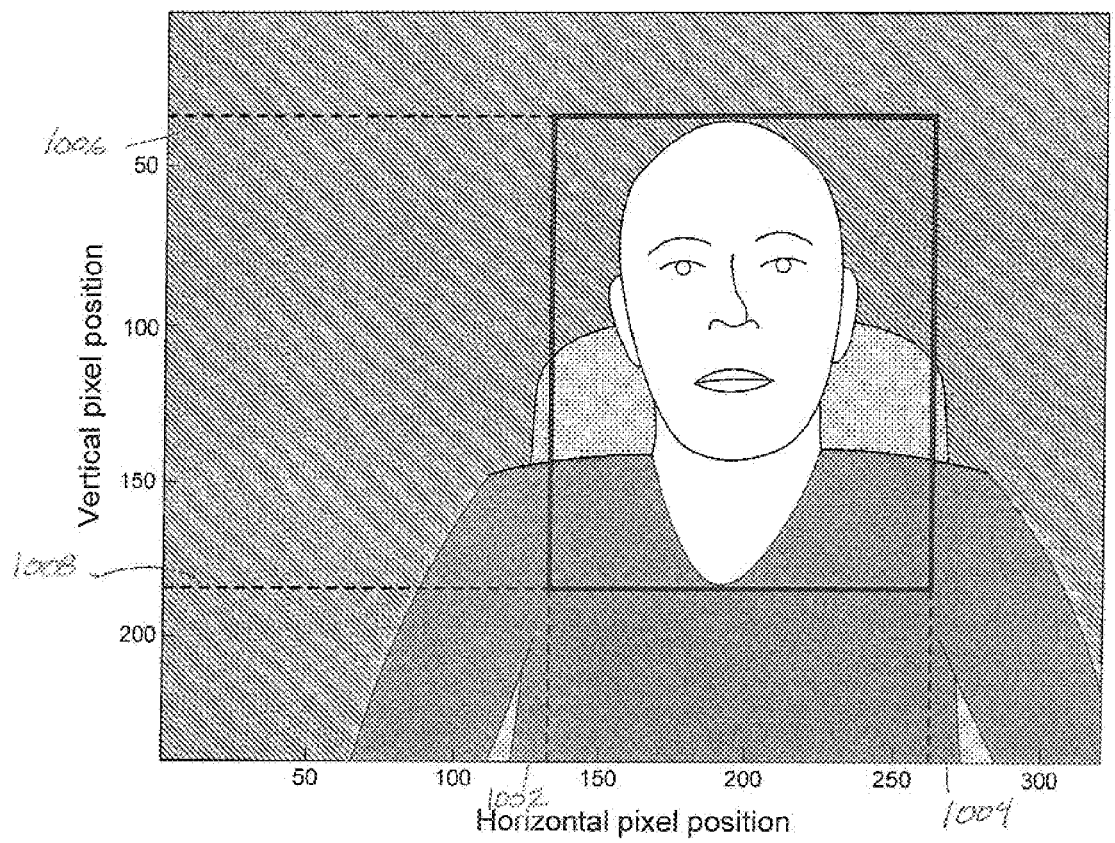
FIG. 11 shows a video frame of a person's face surrounded by boundaries obtained in accordance with embodiments of the present invention

FIG. 10A shows a plot of the projection $p_H(x)$, and FIG. 10B shows a plot of the projection $p_H(y)$. The projections $p_H(x)$ and $p_H(y)$ are histograms produced for an actual person whose likeness has been recreated in the cartoon shown in FIG. 9. Dashed lines 1002 and 1004 represents places where the curve, shown in FIG. 10A, representing $p_H(x)$ meets the horizontal pixel axis, and dashed lines 1006 and 1008 represent places where the curve, shown in FIG. 10B, representing $p_H(y)$ meets the vertical pixel axis. Dashed lines 1002, 1004, 1006, and 1008 define boundaries of a rectangle superimposed over the image shown in FIG. 11. Note the image shown in FIG. 11 is identical to the image shown in FIG. 9. The rectangle frames the pixels associated with the participant's face and can be used to crop the portion of the image that lies within the rectangle, and thereby remove unnecessary background material and accentuate the participant's face. For example, after the image is cropped to accentuate the participant's face, the cropped portion can be enlarged.

Figure 12:
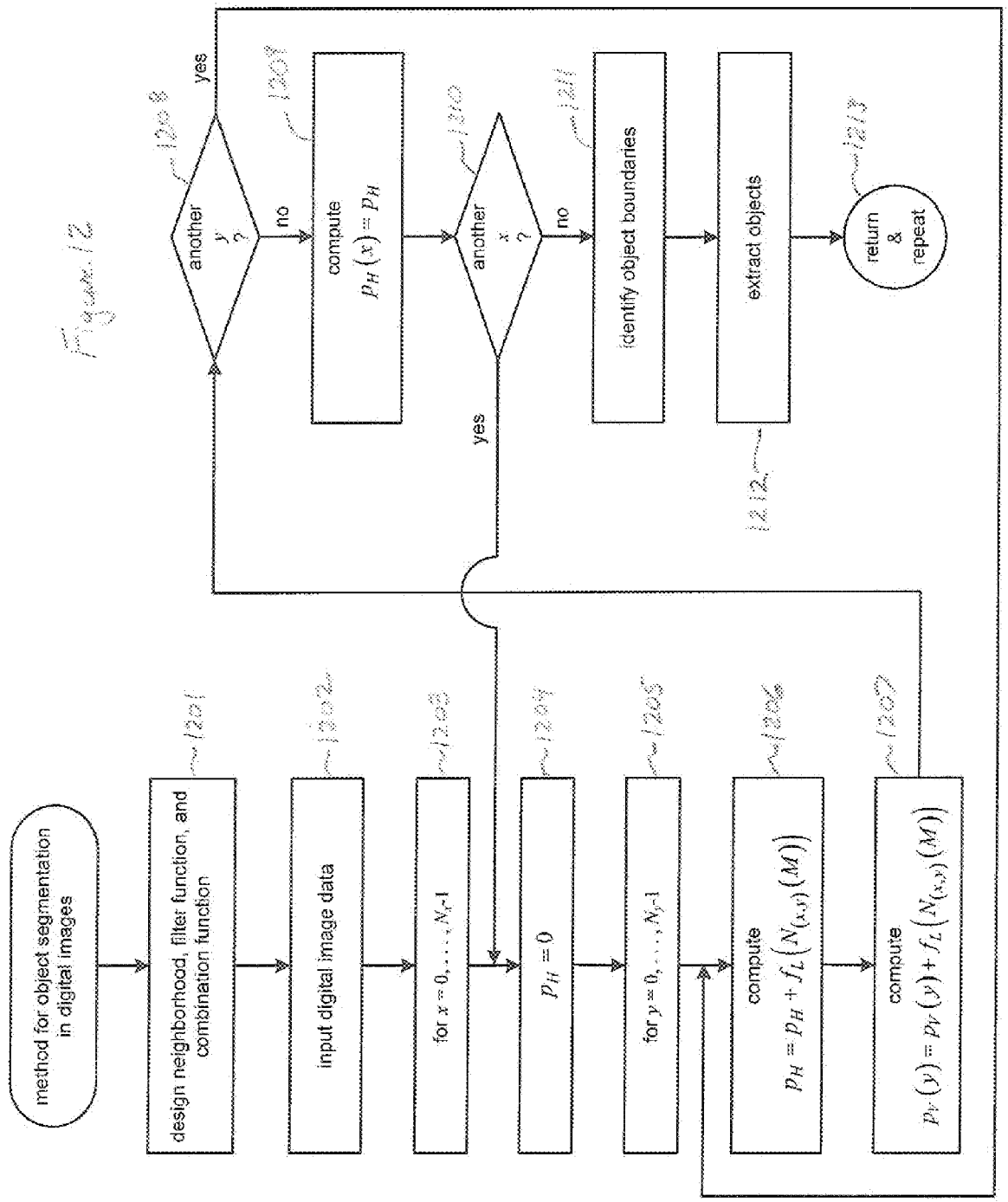
FIG. 12 shows a control-flow diagram that represents a method for segmenting and extracting a person's face displayed in a digital image in accordance with embodiments of the present invention.

FIG. 12 shows a control-flow diagram that represents a method for segmenting objects displayed in a digital image using a summation operator for the combination function in accordance with embodiments of the present invention. In step 1201, a neighborhood, a filter function that separates pixels is designed, such as the filter function and summation described above with reference to FIG. 10. In step 802, digital image data corresponding to a single video frame of a continuous video stream is input. In the for-loop beginning with step 1203, steps 1204-1209 are repeated. In step 1204, a constant $p_H$ is initialized to the value "0." In the for-loop beginning with step 1205, steps 1206-1208 are repeated. In step 1206, $p_H$ is calculated using the local function designed in step 1201. In step 1207, array element $p_V(y)$ is calculated using the local function designed in step 1201. In step 1208, when y equals $N_y-1$, the method proceeds to step 1209, otherwise steps 1206 and 1207 are repeated for the next value of y. In step 1209, the array element $p_H(x)$ is assigned the value $p_H$. In step 1210, when x equals $N_x-1$, the method proceeds to step 1211, otherwise steps 1204-1209 are repeated for the next value of x. In step 1211, based on the projections $p_H(x)$ and $p_V(y)$ object boundaries are identified and can be used to form a rectangle or other suitable shape that contains the pixels associated with the object. In step 1212, the boundaries can be used to crop the pixel data within the rectangle from the video frame in order to extract in image that accentuates the object. In step 1213, the steps 1201-1212 can be repeated for the next video frame. Note that steps 1201-1213 can be performed in a single pass of the video frame data. In other words, both the horizontal and vertical projections can be formed simultaneously.

IV. Computational Devices

In general, the methods employed to generate a document described above can be implemented on a computing device, such as a desktop computer, a laptop, or any other suitable device configured to carrying out the processing steps of a computer program. FIG. 13 shows a schematic representation of a computing device 1300 configured in accordance with embodiments of the present invention. The device 1300 may include one or more processors 1302, such as a central processing unit; one or more display devices 1304, such as a monitor; one or more network interfaces 1306, such as a Local Area Network LAN, a wireless 802.11x LAN, a 3G mobile WAN or a WiMax WAN; and one or more computer-readable mediums 1308. Each of these components is operatively coupled to one or more buses 1310. For example, the bus 1310 can be an EISA, a PCI, a USB, a FireWire, a NuBus, or a PDS.

The computer readable medium 1308 can be any suitable medium that participates in providing instructions to the processor 1302 for execution. For example, the computer readable medium 1308 can be non-volatile media, such as firmware, an optical disk, a magnetic disk, or a magnetic disk drive; volatile media, such as memory; and transmission media, such as coaxial cables, copper wire, and fiber optics. The computer readable medium 1308 can also store other software applications, including word processors, browsers, email, Instant Messaging, media players, and telephony and teleconference software.

The computer-readable medium 1308 may also store an operating system 1312, such as Mac OS, MS Windows, Unix, or Linux; network applications 1314; and an object segmentation application 1316. The operating system 1312 can be multi-user, multiprocessing, multitasking, multithreading, real-time and the like. The operating system 1312 can also perform basic tasks such as recognizing input from input devices, such as a keyboard, a keypad, or a mouse; sending output to the display 1304; keeping track of files and directories on medium 1308; controlling peripheral devices, such as disk drives, printers, image capture device; and managing traffic on the one or more buses 1310. The network applications 1314 includes various components for establishing and maintaining network connections, such as software for implementing communication protocols including TCP/IP, HTTP, Ethernet, USB, and FireWire.

A object segmentation application 1316 provides various software components for performing object segmentation in digital images, as described above. In certain embodiments, some or all of the processes performed by the application 1316 can be integrated into the operating system 1312. In certain embodiments, the processes can be at least partially implemented in digital electronic circuitry, or in computer hardware, firmware, software, or in any combination thereof.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for segmenting an object of interest in a digitally-encoded image using a computing device, the method comprising:
    designing a non-linear local function that generates function values associated with identifying the object of interest encoded in digital image data and a combination function that combines the function values;
    forming orthogonal projections of the digital image data using the computing device, the orthogonal projections based on the function values and the combination function;
    based on the orthogonal projections, determining boundaries segmenting the object in the digital image data using the computing device; and
    extracting an image of the object that lies within the boundaries using the computing device.

2. The method of claim 1 wherein the non-linear local function further comprises a mapping of pixel values associated with a neighborhood of a pixel to a single value for the pixel.

3. The method of claim 1 wherein the non-linear local function further comprises a non-linear filter function.

4. The method of claim 1 wherein forming orthogonal projections of the digital image data further comprises filtering pixels values based on luminance.

5. The method of claim 1 wherein forming orthogonal projections of the digital image data further comprises filtering pixels values based on depth.

6. The method of claim 1 wherein forming orthogonal projections of the digital image data further comprises filtering pixels values based on color.

7. The method of claim 1 wherein the combination function combines the output of the local functions along one direction of the image data.

8. The method of claim 1 wherein forming the orthogonal projections of the digital image data further comprises:
    forming a first projection of the digital image data in a first direction using the computing device, the first projection based on the filter function and the combination function; and
    forming a second projection of the digital image data in a second direction using the computing device, the second projection based on the filter function and the combination function, and the second direction orthogonal to the first direction.

9. The method of claim 1 wherein determining boundaries of the object in the image data further comprise determining where each orthogonal projection equals zero.

10. The method of claim 1 wherein extracting the image of the object that lies within the boundaries further comprises cropping the image data associated with the object by discarding image data located outside the boundaries.

11. A non-transitory computer-readable medium having instructions encoded thereon for enabling a processor to perform the operations of:
    designing a non-linear local function that generates function values associated with identifying the object of interest encoded in digital image data and a combination function that combines the function values;
    forming orthogonal projections of the digital image data, the orthogonal projections based on the function values and the combination function;
    based on the orthogonal projections, determining boundaries segmenting the object in the image data; and
    extracting an image of the object that lies within the boundaries.

12. The medium of claim 11 wherein the non-linear local function further comprises a mapping of pixel values associated with a neighborhood of a pixel to a single value for the pixel.

13. The medium of claim 11 wherein the non-linear local function further comprises a non-linear filter function.

14. The medium of claim 11 wherein forming orthogonal projections of the digital image data further comprises filtering pixels values based on luminance.

15. The medium of claim 11 wherein forming orthogonal projections of the digital image data further comprises filtering pixels values based on depth.

16. The medium of claim 11 wherein forming orthogonal projections of the digital image data further comprises filtering pixels values based on color.

17. The medium of claim 11 wherein the combination function combines the output of the local functions along one direction of the image data.

18. The medium of claim 11 wherein forming the orthogonal projections of the digital image data further comprises:
    forming a first projection of the digital image data in a first direction using the computing device, the first projection based on the filter function and the combination function; and
    forming a second projection of the digital image data in a second direction using the computing device, the second projection based on the filter function and the combination function, and second direction orthogonal to the first direction.

19. The medium of claim 11 wherein determining boundaries of the object in the image data further comprise determining where each orthogonal projection equals zero.

20. The medium of claim 11 wherein extracting the image of the object that lies within the boundaries further comprises cropping the image data associated with the object by discarding image data located outside the boundaries.

* * * * *